United States Patent [19]

Usamoto et al.

[11] 3,950,281

[45] Apr. 13, 1976

[54] ELASTOMERIC COMPOSITIONS CONTAINING OLEFIN-ACRYLIC ESTER COPOLYMER

[75] Inventors: Teruyoshi Usamoto, Osaka; Taisuke Okita, Toyonaka; Nobuyuki Yoshida, Takatsuki; Masaaki Hirooka, Ibaraki; Isoji Taniguchi, Toyonaka; Shyozaburo Imai, Ibaraki, all of Japan

[73] Assignee: Sumitomo Chemical Company, Limited, Japan

[22] Filed: Jan. 31, 1974

[21] Appl. No.: 438,183

Related U.S. Application Data

[60] Division of Ser. No. 279,289, Aug. 10, 1972, Pat. No. 3,833,689, which is a continuation of Ser. No. 29,276, April 16, 1972, abandoned.

[30] Foreign Application Priority Data

Apr. 16, 1969  Japan.............................. 44-29900

[52] U.S. Cl................... 260/4 R; 260/5; 260/888; 260/889; 260/896; 260/897 B
[51] Int. Cl.²..... C08L 7/00; C08L 9/02; C08L 9/06
[58] Field of Search................ 260/888, 889, 5, 4 R

[56] References Cited
UNITED STATES PATENTS

| | | | |
|---|---|---|---|
| 2,929,795 | 3/1960 | Reid et al........................ | 260/4 R X |
| 3,326,833 | 6/1967 | Raley............................... | 260/28.5 |

*Primary Examiner*—Carman J. Seccuro
*Attorney, Agent, or Firm*—Craig & Antonelli

[57] ABSTRACT

Elastomeric compositions comprising 1 part by weight of at least one curable elastomer and 0.01 to 100 parts by weight of at least one copolymer having olefin and acrylic ester monomer units as the main constituents, which possess improved properties in tackiness, processability, oil resistance, thermal resistance, weathering resistance and the like.

49 Claims, No Drawings

ELASTOMERIC COMPOSITIONS CONTAINING OLEFIN-ACRYLIC ESTER COPOLYMER

This is a division of application Ser. No. 279,289 filed Aug. 10, 1972, now U.S. Pat. No. 3,833,689, which is a continuation of application Ser. No. 29,276, filed Apr. 16, 1972, now abandoned.

The present invention relates to elastomeric compositions comprising olefin-acrylic ester copolymers and curable elastomers. This invention also relates to co-curable elastomeric compositions comprising curable olefin-acrylic ester copolymers and rubbers.

In the blending of polymers, there is very often observed insufficient compatibility. Still, no favorable co-curability can be expected in the insufficient blending if the cured rubber is aimed. For instance, favorable results of curing are difficult to be attained by blending an elastomer having polar group for the purpose of improving the poor solvent resistance of hydrocarbon rubbers. There are some synthetic rubbers of which application is restrained because of inferiorities of properties such as tackiness and processability in the uncured state of the compound used. Therefore, it is frequently requested to incorporate a compound having a polar group to the synthetic rubber without loss of the inherent properties of the rubber, but practically such a suitable compound is difficult to be found. As results of investigations on the method of admixing an ester compound with various elastomers, the present inventors have found that an olefin-acrylic ester copolymer is successfully compatible and blendable with a broad scope of elastomers and that the resultant compositions can be cured without accompanying deteriorations of properties of the cured products. Thus, the present invention has been established.

Accordingly, a basic object of the present invention is to provide an elastomeric composition containing a copolymer having olefin and acrylic ester monomer units as main constituents and at least one curable elastomer. Especially, the invention provides an elastomeric composition containing 0.01 to 100 parts by weight of olefin-acrylic ester copolymer on the basis of 1 part by weight of curable elastomer. A special object of the present invention is to provide a co-curable composition comprising a curable olefin-acrylic ester copolymer and at least one curable elastomer. A further object of the present invention is to provide a process for preparing an elastomeric composition containing olefin-acrylic ester copolymer and curable elastomer.

The olefin used in the copolymer of this invention is effective for increasing the affinity for hydrocarbon elastomers and thus the present copolymers are superior to the acrylic ester homopolymers. The polar ester group brings to the elastomer improvements of tackiness, oil resistance, chemical resistance, weathering resistance and aging resistance. It is one of the important effects on the present invention that there has been overcome the defects including poor tackiness and ill processability of the uncured elastomeric compound of which many conventional synthetic rubbers are suffered. Of synthetic rubbers, ethylene-propylene terpolymers and butadiene-styrene copolymers show particularly poor tackiness and ill processability in the uncured elastomeric compound, of which improvement is desired. The said defects can be now overcome by using the olefin-acrylic ester copolymers of this invention which are well compatible with those elastomers, and there is observed no deterioration on the properties of the cured products.

It is another advantage of the elastomeric compositions of this invention that the olefin-acrylic ester copolymer has an affinity for a large number of elastomers and is blendable with them successfully. The olefin-acrylic ester copolymers including unsaturated group are sulfur-curable, and the compositions including these copolymers are co-curable with the opponent elastomer whereby further enhanced improvements are attained.

It is one of the most important points in the present invention that the olefin-acrylic ester copolymers can be incorporated with a wide range of rubbers from low-unsaturated rubbers to diene rubbers having high unsaturation to give co-cured elastomers having sufficiently good mechanical strengths. Heretofore, it has been easy to co-cure a low-unsaturated rubber and other low-unsaturated rubber or a diene rubber and other diene rubber, but it has been difficult to co-cure a low-unsaturated rubber with a diene rubber. For instance, EPDM rubber has not been obtained co-cured materials with diene rubbers having good properties, and there has been many problems. In such circumstances, the compositions of the present invention are of interest and important in the practical points of view.

As elastomers which can be combined with the olefin-acrylic ester copolymers, there are exemplified sulfur-curable or amine-curable various synthetic elastomers and natural elastomers including ethylene-propylene rubber, butyl rubber, butadiene-styrene rubber, polybutadiene rubber, butadiene-acrylonitrile rubber, polyisoprene rubber, natural rubber, acrylic rubber, chloroprene rubber, halogenated ethylene-propylene rubber and halogenated butyl rubber. Above all, hydrocarbon rubbers such as ethylene-propylene-diene rubber, butyl rubber or butadiene-styrene rubber are more favorable for combination with the olefin-acrylic ester copolymers. The elastomeric component may be used in a mixture of one or more sorts of these rubbers.

Since the olefin-acrylic ester copolymer of this invention is combined with an elastomer to form an elastomeric composition, the olefin-acrylic ester copolymer having a low secondary transition point may be favorably used. Although an acrylic ester homopolymer shows poor compatibility with synthetic elastomers or natural rubber, the olefin component in the copolymer increases the affinity for hydrocarbon elastomers. From this meaning, there may be favorably used such olefins as form a polymer having a low secondary transition point. Such a favorable olefin involves an olefinic hydrocarbon and their halogenated compound containing 2 to 20 carbon atoms, more favorably α-olefin containing 3 to 8 carbon atoms. Diolefins and halogen-containing olefins and dienes which can be converted into elastomers readily may be used, too. In these cases, the copolymers of diolefins or halogenated olefins with acrylic esters are sulfur-curable or amine-curable. In these olefins, isobutylene and propylene are especially useful. Examples of the olefins, that is, are isobutylene, propylene, ethylene, butene-1, pentene-1, 2-methylbutene-1, 2-methylpentene-1, hexene-1, butene-2, 4-methylpentene-1, 2-methyl-4-phenylbutene-1, octadecene-1, 1,3-butadiene, 1,3-pentadiene, isoprene, 1,4-hexadiene, 1,3,5-hexatriene, chloroprene, β-methallyl chloride and 2-methyl-4-chloropentene-1.

For the ester group in the acrylic ester which is copolymerized with the olefin, hydrocarbon groups containing 1 to 20 carbon atoms and their halogenated compounds are preferable. Examples of the hydrocarbon group are alkyl, alkenyl, aryl, aralkyl, aralkenyl, alkylaryl, alkenylaryl, cycloalkyl and cycloalkenyl, and their halogenated groups. In particular, alkyl group having 1 to 10 carbon atoms is suitable for elastomers, and alkyl having 2 to 8 carbon atoms is more suitable. Examples of the acrylic ester are methyl acrylate, ethyl acrylate, propyl acrylate, allyl acrylate, crotyl acrylate, n-butyl acrylate, t-butyl acrylate, n-amyl acrylate, n-hexyl acrylate, 2-ethylhexyl acrylate, cyclopentenyl acrylate, octadecyl acrylate, methallyl acrylate, citronellyl acrylate, cinnamyl acrylate, o-tolyl acrylate, benzyl acrylate, cyclohexyl acrylate, norbornenylmethyl acrylate, 2-chloroethyl acrylate, 3-chloropropyl acrylate, $\beta$-chloroallyl acrylate, methyl thiolacrylate and ethyl thiolacrylate. Still, there may be used acrylic esters having a substituent such as a hydrocarbon group, a halohydrocarbon group or a halogen atom at the $\alpha$- or $\beta$-position of the acrylic acid.

As sulfur-curable copolymers, there are favorably used such copolymers as olefin and/or acrylic ester containing directly at least partially a double bond to act as a sulfur-curing site. As unsaturated groups in the component to be sulfur-curing site, there may be favorably used components having an internal double bond inert to the polymerization because there is observed no formation of troublesome gels. Thus, it is favorable to use acrylic acid unsaturated esters above described illustratively as a sulfur-curing site.

Further, as co-monomer components affording the sulfur-curing site, there may be effectively used a rather small amount of monomers producing a polymer having a higher secondary transition point. As such co-monomers, there are exemplified various polyene hydrocarbons or halohydrocarbons and acrylic acid unsaturated esters which are out of the scope of the olefin because of higher secondary transition point, and as the other comonomers, unsaturated ethers and acrylic acid unsaturated amides. These comonomers include divinylbenzene, p-isopropenylstyrene, p-allylstyrene, 5-ethylidene-2-norbornene, 5-methyl-2,5-norbornadiene, dicyclopentadiene, 1,5-cyclooctadiene, 6-methyl-4,7,8,9-tetrahydroindene, 4-vinylcyclohexene, aldrin, p-(1'-chloro-1'-propenyl)-styrene, 1'-propenyl vinyl ether, cyclohexenyl acrylate and N-(1'-propenyl)acrylamide.

The olefin-acrylic ester copolymers having halogen atom are in general amine-curable. For instance, halogen-containing acrylic esters and halogen-containing olefins may be used at least partially for copolymerization. Further, other halogen-containing compounds which can be copolymerized with olefin and acrylic ester may be used as a third component for copolymerization. Favorable examples of the third component are halogen-containing unsaturated ethers including 2-chloroethyl vinyl ether, 4-chlorobutyl vinyl ether and isobutyl 2-chloroallyl ether, and halogenated olefins and halogen-containing carboxylic acid unsaturated esters may be also used, too. Still, there may be used other olefin-acrylic ester copolymers which are modified by using the other co-monomers.

The olefin-acrylic ester copolymers in the elastomeric compositions of the present invention are prepared in an arbitrary method. In particular, copolymers having high molecular weight can be effectively prepared from olefin and acrylic ester via a complex of a Lewis acid such as metal halide with carbonyl groups of the ester. The copolymerization may proceed effectively in the presence of an organic metal compound as an initiator. The important copolymers are alternating ones which may be prepared effectively by copolymerizing olefin and acrylic ester in the presence of an organic halide of aluminum or boron. Ethylenically unsaturated monomers having the other double bond or a halogen atom may be used in addition to the olefin and acrylic ester to give multicomponent alternating interpolymers. The details of such multicomponent alternating copolymers were described in the specification of French Pat. No. 1,528,220.

As the preferable olefin-acrylic ester copolymers of the present invention, there are copolymers derived from such olefins as isobutylene and propylene and acrylic esters having ester groups selected from ethyl, n-butyl, 2-ethyl-hexyl and methyl esters, as main constituents. The copolymer using ethyl acrylate is suitable as an elastomer, and the copolymers derived from esters having more than three carbon atoms (e.g. n-butyl ester, 2-ethylhexyl ester) are favorable for the improvement of tackiness. Compositions of the copolymer are desirable to be selected so that the products are elastomeric, and there is ordinarily used a copolymer comprising 10 to 70 mole %, preferably 30 to 50 mole %, of the olefin component and 90 to 30 mole %, preferably 70 to 50 mole %, of the acrylic ester component. As a third component, other co-monomers can be copolymerized in an extent enough not to damage the elastomeric properties. In general, 0.1 to 30 mole %, preferably 0.5 to 10 mole %, of the co-monomer having two unsaturated groups or a halogen atom may be incorporated into the copolymer for working as a sulfur-curing site or an amine-curing site. Still, much more functional groups can be incorporated, e.g. for the purpose of increasing the mutual affinity with diene rubbers or for the other purposes.

The most important copolymers in the present invention are the so-called alternating copolymers wherein olefin and acrylic ester are combined alternately, i.e. 50 mole % of olefin and 50 mole % of acrylic ester are contained. In the multicomponent alternating copolymer wherein other comonomers are incorporated as the third components, 50 mole % of A group monomers and 50 mole % of B group monomers are contained. Said co-monomers are classified in A group and B group whether they react similarly as olefin or as acrylic ester. The detailed descriptions thereof appears in Japanese patent application Nos. 36745/1966, 70976/1968 and 99858/1969. The A group monomers involve $\alpha$-olefins, internal olefins, styrenes, other ethylenically unsaturated hydrocarbon monomers, dienes, carboxylic acid unsaturated esters, unsaturated ethers and halogen-substituted compounds thereof, and the B group monomers involve acrylonitrile, acrylic acid, acrylic esters, acryloyl halides, acrylamides, their halogenated compounds and $\alpha$- or $\beta$-substituted compounds thereof.

The copolymers in the present invention have in general high molecular weights and the intrinsic viscosity measured at 30°C in benzene solution is in the range of 0.1 to 10 dl/g, preferably 0.5 to 7 dl/g.

The elastomeric compositions of the present invention comprise the olefin-acrylic ester copolymer and rubber in a free ratio. For instance, an elastomeric composition containing 0.01 to 100 parts by weight of the olefin-acrylic ester copolymer per 1 part by weight of the rubber is practically valuable. When there are used non-curable olefin-acrylic ester copolymers, 1 to 40 parts by weight, favorably 2 to 20 parts by weight, of the copolymer per 100 parts by weight of the elastomer may be preferably used. The elastomeric compositions of this invention may be prepared by blending the whole components in a voluntary method, for instance, with a roll mill, a Banbury mixer, a calender roll, a kneader blender, or an extruder.

In the present invention, a co-curable elastomeric composition comprising a sulfur-curable olefin-acrylic ester copolymer and a sulfur-curable elastomer is very important. In this case, the proportion of blending may be arbitrarily chosen, and every composition is useful. In particular, favorable elastomeric compositions are such elastomers as sulfur-curable ethylene-propylene copolymer, butyl rubber and butadiene-styrene copolymer, and particularly elastomeric compositions including isobutylene-ethyl acrylate-acrylic unsaturated ester are useful.

It is well known that sulfur-curable ethylene-propylene elastomer (EPDM) is hardly co-curable with diene elastomers such as butadiene-styrene rubber, polybutadiene and natural rubber. Thus, it is surprising that co-cured elastomeric compositions having excellent mechanical properties in the cured state can be obtained by blending in sulfur-curable isobutylene-acrylic ester copolymer and EPDM in any proportion.

On the other hand, an elastomeric composition comprising an amine-curable elastomer and a halogen-containing olefin-acrylic ester copolymer can be co-cured by amine-curing, and halogen-containing olefin-acrylic ester copolymers may be also added to sulfur-curable elastomers for improving properties thereof.

The elastomeric compositions of this invention can be combined with various other components such as curing agents, sulfur, fillers, stabilizers and diluents.

Sulfur and sulfur-curing accelerators may be used for obtaining the sulfur-cured products from the curable elastomeric compositions of this invention. Such curing-accelerators involve various compounds in thiazole series, sulfenamide series, thiazoline series, thiuram series, dithiocarbamate series, aldehyde-amine series and guanidine series. Examples of the curing accelerators are 2-mercaptobenzothiazole, dibenzothiazyl disulfide, methylene-aniline-mercaptobenzothiazole, cyclohexylbenzothiazylsulfenamide, 2-mercaptothiazoline, tetramethylthiuram disulfide, tetramethylthiuram monosulfide, tellurium dimethyldithiocarbamate, zinc dimethyldithiocarbamate, zinc dibenzyldithiocarbamate, zinc dibutyldithiocarbamate, dinitrophenyl dimethyldithiocarbamate, butylaldehyde-aniline condensate, and di-o-tolylguanidine. These compounds may be used alone or in a mixture of more than one compound. A suitable curing-accelerator may be selected according to the sort of elastomers, and there is used ordinarily 0.1 to 5 parts by weight, favorably 0.5 to 2 parts by weight, of the accelerator per 100 parts by weight of the elastomer. A suitable amount of sulfur is 0.1 to 5 parts by weight, favorably 0.5 to 2 parts by weight, per 100 parts by weight of elastomer.

Amine-curable compositions may be cured with a basic substance as an amine-curing agent. The amine-curing agents invole basic compounds having at least two nitrogen atoms such as aliphatic polyamines, heterocyclic compounds having at least two nitrogen atoms, their amine condensates, such as ureas, thioureas, Schiff bases or carbamates. The amine-curing may be favorably effected in the presence of sulfur.

Other spontaneous components may be added to the elastomeric compositions of the present invention, if desired. These components involve fillers such as carbon black, hard clay, fine-powdery silicic acid, artificial silicate and calcium carbonate; plasticizers such as process oil and resins; minerals such as zinc oxide, magnesia and titania; stearic acid and antioxidants.

Practical and presently-preferred embodiments of the present invention are illustratively shown in the following examples wherein parts are by weight.

EXAMPLE 1

An olefin-acrylic ester copolymer (50:50) (10 or 20 parts) was admixed with ethylene-propylene-5-ethylidene-2-norbornene terpolymer (Royalene 501, manufactured by Uniroyal Co., Ltd.) (100 parts) at 40° to 50°C by two rolls. To the resulting mixture, there were added and blended HAF carbon black (50 parts), zinc oxide (5 parts), stearic acid (1 part), sulfur (1.5 parts), tetramethylthiuram monosulfide (1.5 parts) and 2-mercaptobenzothiazole (0.5 part).

The obtained compound was passed through an aperture of rolls to give a sheet (about 1 mm thickness), which was used as a test sample for measurement of tackiness. The measurement was carried out using a pick-up type tack meter (manufactured by Toyo Seiki Co., Ltd.) under the following conditions: temperature, 25°C; loading weight, 500 g; loading period, 10 seconds; peeling rate, 10 cm/minute.

The said sample product was cured under pressing at 150°C for 10 minutes and subjected to measurement of physical properties. The modulus at 200% elongation, tensile strength at break, elongation at break and hardness were measured at 20°C in a tensile rate of 500 mm/minute with a tensile tester (manufactured by Shimadzu Seisakusho Ltd.) according to the JIS-K-6301 method.

The used olefin-acrylic ester copolymers are shown in Table 1, and Table 2 shows the tackiness and physical properties of the compositions comprising olefin-acrylic ester copolymers and ethylene-propylene-5-ethyliene-2-norbornene terpolymer.

Table 1

| Sample No. | Composition of copolymer | Ratio of monomeric components | $[\eta]$*) |
|---|---|---|---|
| I | Propylene-ethyl acrylate | 50/50 | 4.25 |
| II | Propylene-butyl acrylate | 50/50 | 2.40 |
| III | Isobutylene-ethyl acrylate | 50/50 | 2.75 |
| IV | Isobutylene-butyl acrylate | 50/50 | 5.79 |
| V | Isobutylene-2-ethylhexyl acrylate | 50/50 | 3.65 |
| VI | Pentene-butyl acrylate | 50/50 | 3.45 |

Note:
*) Measured at 30°C in benzene.

Table 2

| | Control | | | | Embodiments of the invention | | | | | | | |
|---|---|---|---|---|---|---|---|---|---|---|---|---|
| Ethylene-propylene-5-ethylidene-2-norbornene terpolymer | 100 | 100 | 100 | 100 | 100 | 100 | 100 | 100 | 100 | 100 | 100 | 100 |

Table 2-continued

| (parts) | | Control | | | | Embodiments of the invention | | | | | | | | |
|---|---|---|---|---|---|---|---|---|---|---|---|---|---|---|
| Copolymer | Sort*) | — | I | I | II | II | III | III | IV | IV | V | V | VI | VI |
| | Amount (parts) | — | 10 | 20 | 10 | 20 | 10 | 20 | 10 | 20 | 10 | 20 | 10 | 20 |
| Tackiness | (g/mm) | 24.5 | 39.2 | 51.5 | 35.6 | 49.3 | 44.5 | 57.9 | 44.3 | 54.3 | 37.8 | 50.0 | 39.0 | 49.3 |
| Physical properties | 200 % Modulus (kg/cm²) | 90 | 86 | 84 | 82 | 81 | 80 | 79 | 83 | 81 | 86 | 78 | 84 | 75 |
| | Tensile strength (kg/cm²) | 203 | 192 | 189 | 196 | 190 | 191 | 188 | 194 | 189 | 190 | 182 | 189 | 179 |
| | Elongation (%) | 425 | 505 | 535 | 490 | 515 | 485 | 550 | 450 | 495 | 435 | 485 | 420 | 435 |

Note:
*) Numerals correspond to those in Table 1.

EXAMPLE 2

Copolymer I, III or V as shown in Table 1 (10 or 20 parts) was admixed with styrene-butadiene rubber (SBR 1,500, manufactured by Japan Synthetic Rubber Co., Ltd.) (100 parts) at 40° to 50°C by two rolls. To the resulting mixture, there were added and blended HAF carbon black (50 parts), zinc oxide (5 parts), stearic acid (1 part), sulfur (2 parts) and N-cyclohexyl-2-benzothiazylsulfenamide (2 parts).

The tackiness and physical properties of the obtained compound were measured as in Example 1.

The results are shown in Table 3.

Table 3

| | Control | Embodiments of the invention | | | | | |
|---|---|---|---|---|---|---|---|
| Styrene-butadiene rubber (parts) | 100 | 100 | 100 | 100 | 100 | 100 | 100 |
| Copolymer Sort*) | — | I | I | III | III | V | V |
| Amount (parts) | — | 10 | 20 | 10 | 20 | 10 | 20 |
| Tackiness (g/mm) | 28.6 | 41.5 | 59.3 | 43.2 | 61.1 | 45.5 | 69.8 |
| Physical properties 200 % Modulus (kg/cm²) | 41 | 39 | 37 | 37 | 31 | 40 | 35 |
| Tensile strength (kg/cm²) | 233 | 221 | 215 | 219 | 205 | 227 | 213 |
| Elongation (%) | 700 | 785 | 805 | 795 | 850 | 755 | 800 |

Note:
*)Numerals correspond to those in Table 1.

EXAMPLE 3

Fifteen parts of isobutylene-n-butyl acrylate-2-chloroethyl vinyl ether terpolymer (chlorine content, 2.53%; isobutylene, 49 mol %) (polymer A) or propylene-2-ethylhexyl acrylate-2-chloroethyl acrylate terpolymer (chlorine content, 1.67%; propylene, 47 mol %) (polymer B) were blended with ethylene-propylene-5-ethylidene-2-norbornene terpolymer (Royalene 501) (100 parts) by two rolls. To the resulting mixture, there were added and blended HAF carbon black (50 parts), zinc oxide (5 parts), stearic acid (1 part), sulfur (1.5 parts), tetramethylthiuram disulfide (1.5 parts) and 2-mercaptobenzothiazole (0.5 part).

The obtained compound was passed through an aperture of rolls to give a sheet (1 mm thickness), which was used as a test sample for measurement of tackiness. The measurement was carried out at 25°C with a pick-up type tack meter (manufactured by Toyo Seiki Co., Ltd.).

The results are shown as follows:

| Composition of compound | Tackiness (g/mm) |
|---|---|
| Ethylene-propylene-5-ethylidene-2-norbornene terpolymer alone (Control) | 25.1 |
| Polymer A blended | 60.3 |
| Polymer B blended | 55.7 |

EXAMPLE 4

Fifteen parts of isobutylene-n-butyl acrylate-2-chloroethyl vinyl ether terpolymer (polymer A) or propylene-2-ethylhexyl acrylate-2-chloroethyl acrylate terpolymer (polymer B) were blended with butadiene-styrene copolymer (100 parts) (SBR 1500, manufactured by Japan Synthetic Rubber Co., Ltd.) by two rolls. To the resulting mixture, there were added and blended HAF carbon black (50 parts), zinc oxide (5 parts), stearic acid (1 part), sulfur (2 parts) and N-cyclohexyl-2-benzothiazylsulfenamide (2 parts). The tackiness of the resultant compound was measured as in Example 3.

The results are shown as follows:

| Composition of compound | Tackiness (g/mm) |
|---|---|
| Butadiene-styrene copolymer alone (Control) | 30.6 |
| Polymer A blended | 58.6 |
| Polymer B blended | 55.2 |

EXAMPLE 5

Ethylene-propylene-dicyclopentadiene terpolymer (propylene content, 26 mol %; iodine value, 10.2; intrinsic viscosity measured at 70°C in xylene, 1.60 dl/g; Mooney viscosity, $ML_{1+4}$ 52) (25 parts), isobutyleneethyl acrylate-allyl acrylate terpolymer (iodine value, 6.2; isobutylene, 48 mol %) (75 parts), HAF carbon black (50 parts), zinc oxide (5 parts), tetramethylthiuram disulfide (1.5 parts), mercaptobenzothiazole (0.5 parts), sulfur (1.5 parts) and stearic acid (1 part) were blended by a plastograph. The resultant compound was cured under pressing at 160°C for 40 minutes. On the tensile test, the following results were obtained: tensile strength at break, 150 kg/cm$^2$; elongation at break, 310%. The cured product of the isobutyleneethyl acrylate-allyl acrylate terpolymer alone gave the following results: tensile strength at break, 123 kg/cm$^2$; elongation at break, 180%.

The above results indicate that the blended composition is well co-cured.

EXAMPLE 6

Ethylene-propylene-dicyclopentadiene terpolymer (propylene content, 26 mol %; iodine value, 10.2; intrinsic viscosity measured at 70°C in xylene, 1.60 dl/g) (75 parts), isobutylene-ethyl acrylate-crotyl acrylate terpolymer (iodine value, 7.3; isobutylene, 49 mol %) (25 parts), FEF carbon black (50 parts), zinc oxide (5 parts), stearic acid (1 part), tetramethylthiuram monosulfide (1.5 parts), mercaptobenzothiazole (0.5 part) and sulfur (1.5 parts) were blended by a plastograph. The resultant compound was cured under pressing at 160°C for 40 minutes to give an elastomeric product having the following physical properties: tensile strength at break 205 kg/cm$^2$; elongation at break, 440%; 300% modulus, 145 kg/cm$^2$. The cured product was dipped in ASTM No. 1 oil at 150°C for 70 hours whereby the weight increase was 117.3%. The cured product of the ethylenepropylene-dicyclopentadiene terpolymer alone showed 212.5% in weight increase.

These results mean that the co-cured composition holds enhanced oil resistance.

EXAMPLE 7

Isobutylene-allyl acrylate-ethyl acrylate terpolymer (isobutylene, 49 mol %; allyl acrylate, 2.7 mol %; ethyl acrylate, 48.3 mol %) (50 parts), butadiene-styrene copolymer (JSR-1500, manufactured by Japan Synthetic Rubber Co., Ltd.) (50 parts), zinc oxide (3 parts), FEF carbon black (40 parts), stearic acid (2 parts), sulfur (1.5 parts) and N-cyclohexyl-2-benzothiazylsulfenamide (2 parts) were blended by two rolls. The resultant compound was cured under pressing at 150°C for 40 minutes to give a co-cured elastomer being 141 kg/cm$^2$ in tensile strength at break and 240% in elongation at break.

EXAMPLE 8

Isobutylene-allyl acrylate-ethyl acrylate terpolymer (isobutylene, 49 mol %; allyl acrylate, 2.7 mol %; ethyl acrylate, 48.4 mol %) (50 parts), butyl rubber (50 parts), zinc oxide (5 parts), HAF carbon black (50 parts), stearic acid (1 part), sulfur (1.5 parts), tetramethylthiuram disulfide (1.5 parts) and mercaptobenzothiazole (0.5 part) were blended by two rolls. The resultant compound was cured under pressing at 160°C for 40 minutes to give a co-cured elastomer being 158 kg/cm$^2$ in tensile strength at break and 480% in elongation at break.

EXAMPLE 9

Isobutylene-allyl acrylate acrylate-ethyl acrylate terpolymer (isobutylene, 49 mol %; allyl acrylate, 2.7 mol %; ethyl acrylate, 48.4 mol %) (50 parts), butadiene-acrylonitrile copolymer (Hycar-1000 × 132) (50 parts), zinc oxide (5 parts), SRF carbon black (50 parts), sulfur (1.5 parts), stearic acid (1 part) and dibenzothiazole disulfide (1 part) were blended by two rolls. The resultant compound was cured under pressing at 150°C for 40 minutes to give a co-cured elastomer being 128 kg/cm$^2$ in tensile strength at break and 200% in elongation at break.

What is claimed is:

1. An elastomeric composition comprising 1 part by weight of at least one curable elastomer selected from the group consisting of natural diene rubbers and synthetic conjugated diene rubbers and 0.01 to 100 parts by weight of at least one copolymer having olefin and acrylic ester monomer units, said copolymer being composed of 10 to 70 mole % of aliphatic α-olefin monomer units having 3 to 20 carbon atoms, 90 to 30 mole % of acrylic monomer ester units, and 0.1 to 30 mole % of a monomer unit selected from the group consisting of a monomer having at least one double bond and a monomer having at least one halogen atom.

2. A process for preparing an elastomeric composition which comprises blending 1 part by weight of at least one curable elastomer selected from the group consisting of natural diene rubbers and synthetic conjugated diene rubbers with 0.01 to 100 parts by weight of at least one copolymer having aliphatic α-olefin and acrylic ester monomer units, said copolymer being composed of 10 to 70 mole % of the olefin monomer units having 3 to 20 carbon atoms and 90 to 30 mole % acrylic ester monomer units.

3. An elastomeric composition comprising 1 part by weight of at least one curable elastomer selected from the group consisting of natural diene rubbers and synthetic conjugated diene rubbers and 0.01 to 100 parts by weight of at least one copolymer having aliphatic α-olefin and acrylic ester monomer units, said olefin units having 3 to 20 carbon atoms, and said copolymer being composed of 10 to 70 mole % of the olefin monomer units and 90 to 30 mole % of the acrylic ester monomer units.

4. An elastomeric composition which comprises 1 part by weight of at least one cnjugated diene rubber and 0.01 to 100 parts by weight of at least one copolymer having aliphatic α-olefin and acrylic ester monomer units, said copolymer being composed of 10 to 70 mole % of aliphatic α-olefin monomer units having 3 to 20 carbon atoms, and 90 to 30 mole % of acrylic monomer ester units.

5. An elastomeric composition according to claim 4, wherein said copolymer further includes 0.1 to 30 mole % of a different monomer unit selected from the group consisting of a monomer unit having at least two double bonds and a monomer unit having at least one halogen atom.

6. An elastomeric composition according to claim 3, wherein 1 part by weight of at least one curable elastomer is combined with 0.01 to 0.4 part by weight of the copolymer.

7. An elastomeric composition according to claim 3, wherein the olefin monomer unit in the copolymer is isobutylene or propylene.

8. An elastomeric composition according to claim 3, wherein the acrylic ester monomer unit in the copolymer is ethyl acrylate, n-butyl acrylate, 2-ethylhexyl acrylate or methyl acrylate.

9. An elastomeric composition according to claim 3, wherein the copolymer has alternating monomer sequences.

10. An elastomeric composition according to claim 3, wherein sulfur and a sulfur-curing agent are contained in the composition.

11. An elastomeric composition according to claim 3, wherein the olefin monomer unit in the copolymer is isobutylene or propylene and the acrylic ester monomer unit in the copolymer is ethyl acrylate, n-butyl acrylate, 2-ethylehexyl acrylate or methyl acrylate.

12. An elastomeric composition according to claim 3, wherein the copolymer has an alternating sequence of olefin and acrylic ester monomer units.

13. An elastomeric composition according to claim 3, wherein the copolymer has an intrinsic viscosity of 0.1 to 10 dl/g as measured in benzene at 30°C.

14. An elastomeric composition according to claim 3, wherein the alcohol moieties of the acrylic ester units have from 1 to 20 carbon atoms.

15. An elastomeric composition according to claim 14, wherein said composition contains from 1 to 40 parts by weight of the copolymer per 100 parts by weight of the elastomer.

16. The elastomeric composition according to claim 14, wherein said composition contains from 2 to 20 parts by weight of the copolymer per 100 parts by weight of the elastomer.

17. The elastomeric composition according to claim 4, wherein said conjugated diene rubber is selected from the group consisting of natural rubber, butadiene-styrene rubber, polybutadiene rubber, butadiene-acrylonitrile rubber, polyisoprene rubber, chloroprene rubber and butyl rubber.

18. An elastomeric composition according to claim 3, wherein said olefin units have 3 to 8 carbon atoms.

19. An elastomeric composition according to claim 3, wherein the copolymer is a sulfur-curable copolymer having at least one unsaturated bond.

20. An elastomeric composition according to claim 3, wherein the copolymer is an amine-curable copolymer having at least one halogen atom.

21. An elastomeric composition according to claim 3, wherein the copolymer is a sulphur-curable terpolymer of olefin, acrylic ester and acrylic unsaturated ester.

22. An elastomeric composition according to claim 3, wherein the copolymer is a terpolymer of olefin, acrylic ester and dienic hydrocarbon.

23. An elastomeric composition according to claim 3, wherein the copolymer is a terpolymer of olefin, acrylic ester and halogen-containing ester of acrylic acid or halogen-containing unsaturated ether.

24. The elastomeric composition according to claim 14, wherein said alcohol moiety is one derived from a hydrocarbon or a halohydrocarbon.

25. The elastomeric composition according to claim 14, wherein said alcohol moiety is an alkyl group.

26. An elastomeric composition according to claim 3, wherein said curable elastomer is a synthetic conjugated diene rubber.

27. An elastomeric composition according to claim 3, wherein said copolyer is an olefin/acrylate binary copolymer.

28. An elastomeric composition according to claim 27, wherein said curable elastomer is a synthetic diene rubber.

29. An elastomeric composition according to claim 1, wherein said aliphatic $\alpha$-olefin monomer unit has 3 to 8 carbon atoms.

30. An elastomeric composition according to claim 14, wherein said aliphatic $\alpha$-olefin monomer unit has 3 to 8 carbon atoms.

31. An elastomeric composition according to claim 3, wherein said composition contains from 1 to 40 parts by weight of the copolymer per 100 parts by weight of the elastomer.

32. The elastomeric composition according to claim 3, wherein said composition contains from 2 to 20 parts by weight of the copolymer per 100 parts by weight of the elastomer.

33. An elastomeric composition according to claim 3, wherein said $\alpha$-olefin unit is selected from the group consisting of isobutylene, propylene, butene-1, pentene-1, 2-methylbutene-1, 2-methylpentene-1, hexene-1, butene-2, 4-methylpentene-1 and octadecene-1.

34. An elastomeric composition according to claim 3, wherein the alkyl groups on the alkyl acrylate unit are halogenated.

35. An elastomeric composition according to claim 3, wherein said alkyl acrylate is selected from the group consisting of methyl acrylate, ethyl acrylate, propyl acrylate, allyl acrylate, crotyl acrylate, n-butyl acrylate, t-butyl acrylate, n-amyl acrylate, n-hexyl acrylate, 2-ethyl-hexyl acrylate, cyclopentenyl acrylate, octadecyl acrylate, methallyl acrylate, citronellyl acrylate, cinnamyl acrylate, o-tolyl acrylate, benzyl acrylate, cyclohexyl acrylate, norbornenylmethyl acrylate, 2-chloroethyl acrylate, 3-chloropropyl acrylate, $\beta$-chloroallyl acrylate, methyl thiolacrylate and ethyl thiolacrylate.

36. An elastomeric composition according to claim 3, wherein the alkyl acrylate unit in said copolymer is an acrylic acid unsaturated ester.

37. An elastomeric composition according to claim 3, wherein the olefin acrylate copolymer additionally contains a polymerized monomer selected from the group consisting of diene monomers, halogen-containing unsaturated ester monomers and halogen containing unsaturated ether monomers.

38. An elastomeric composition according to claim 3, wherein said copolymer additionally contains a polymerized monomer selected from the group consisting of divinylbenzene, p-isopropenyl-styrene, p-allylstyrene, 5-ethylidene-2-norbornene, 5-methyl-2,5-norbornadiene, dicyclopentadiene, 1,5-cyclooctadiene, 6-methyl-4,7,8,9-tetrahydroindene, 4-vinylcyclohexene, aldrin, p-(1'-chloro-1'-propenyl)-styrene, 1'-propenyl vinyl ether, cyclohexenyl acrylate and N-(1'-propenyl) acrylamide.

39. An elastomeric composition according to claim 3, wherein said copolymer additionally includes a polymerized monomer selected from the group consisting of 2-chloroethyl vinyl ether, 4-chlorobutyl vinyl ether and isobutyl 2-chloroallyl ether.

40. An elastomeric composition according to claim 1, wherein the acrylic ester units have from 1 to 20 carbon atoms.

41. An elastomeric composition according to claim 1, wherein said composition contains from 1 to 40 parts by weight of the copolymer per 100 parts by weight of the elastomer.

42. The elastomeric composition according to claim 1, wherein said composition contains from 2 to 20 parts by weight of the copolymer per 100 parts by weight of the elastomer.

43. An elastomeric composition according to claim 1, wherein said α-olefin unit is selected from the group consisting of isobutylene, propylene, butene-1, pentene-1, 2-methylbutene-1, 1, 2-methylpentene-1, hexene-1, butene-2, 4-methylpentene-1 and octadecene-1.

44. An elastomeric composition according to claim 1, wherein the alkyl groups on the alkyl acrylate unit are halogenated.

45. An elastomeric composition according to claim 1, wherein said alkyl acrylate is selected from the group consisting of methyl acrylate, ethyl acrylate, propyl acrylate, allyl acrylate, crotyl acrylate, n-butyl acrylate, t-butyl acrylate, n-amyl acrylate, n-hexyl acrylate, 2-ethyl-hexyl acrylate, cyclopentenyl acrylate, octadecyl acrylate, methallyl acrylate, citronellyl acrylate, cinnamyl acrylate, o-tolyl acrylate, benzyl acrylate, cyclohexyl acrylate, norbornenylmethyl acrylate, 2-chloroethyl acrylate, 3-chloropropyl acrylate, β-chloroallyl acrylate, methyl thiolacrylate and ethyl thiolacrylate.

46. An elastomeric composition according to claim 1, wherein the alkyl acrylate unit in said copolymer is an acrylic acid unsaturated ester.

47. An elastomeric composition according to claim 1, wherein the olefin acrylate copolymer additionally contains a polymerized monomer selected from the group consisting of diene monomers, halogen-containing unsaturated ester monomers and halogen containing unsaturated ether monomers.

48. An elastomeric composition according to claim 1, wherein said copolymer additionally contains a polymerized monomer selected from the group consisting of divinylbenzene, p-isopropenylstyrene, 1-allylstyrene, 5-ethylidene-2-norbornene, 5-methyl-2,5-norbornadiene, dicyclopentadiene, 1,5-cyclooctadiene, 6-methyl-4,7,8,9-tetrahydroindene, 4-vinylcyclohexene, aldrin, 1-(1'-chloro-1'-propenyl)-styrene, 1'-propenyl vinyl ether, cyclohexenyl acrylate and N-(1'-propenyl) acrylamide.

49. An elastomeric composition according to claim 1, wherein said copolymer additionally includes a polymerized monomer selected from the group consisting of 2-chloroethyl vinyl ether, 4-chlorobutyl vinyl ether and isobutyl 2-chloroallyl ether.

* * * * *

UNITED STATES PATENT OFFICE
CERTIFICATE OF CORRECTION

Patent No. 3,950,281　　　　　　　　　　Dated　April 13, 1976

Inventor(s) Teruyoshi Usamoto, Taisuki Okita, Nobuyuke Yoshida, Masaaki Hirooka, Isoji Taniguchi and Shyozaburo Imai.

It is certified that error appears in the above-identified patent and that said Letters Patent are hereby corrected as shown below:

Title Page, first column, under the heading "Foreign Application Priority Data", after the last line in the column, add -- March 5, 1970　Japan . . . . . . . . . . . 45-19,442 --.

Signed and Sealed this

Tenth Day of August 1976

[SEAL]

Attest:

RUTH C. MASON
*Attesting Officer*

C. MARSHALL DANN
*Commissioner of Patents and Trademarks*